United States Patent [19]

Yamada et al.

[11] Patent Number: 4,980,879
[45] Date of Patent: Dec. 25, 1990

[54] OPTICAL INFORMATION RECORDING AND ERASING METHOD USING TWO LASER BEAMS ON A PHASE CHANGE OPTICAL RECORDING MEDIUM

[75] Inventors: Noboru Yamada, Hirakata; Kenichi Nishiuchi, Moriguchi; Eiji Ohno, Toyonaka, all of Japan

[73] Assignee: Matsushita Electric Industrial Co., Ltd., Osaka, Japan

[21] Appl. No.: 272,253

[22] Filed: Nov. 17, 1988

[30] Foreign Application Priority Data

Nov. 25, 1987 [JP] Japan .................................. 62-296563
Mar. 9, 1988 [JP] Japan .................................. 63-55162

[51] Int. Cl.$^5$ .................................................. G11B 7/00
[52] U.S. Cl. ....................................... 369/100; 369/116
[58] Field of Search .................... 346/76 L, 135.1; 369/100–109, 112, 116, 121, 122, 53–58

[56] References Cited

U.S. PATENT DOCUMENTS

| | | | |
|---|---|---|---|
| 4,403,318 | 9/1983 | Nagashima et al. | 369/100 |
| 4,564,931 | 1/1986 | O'Hara et al. | 369/122 X |
| 4,566,088 | 1/1986 | Yoshida et al. | 369/116 |
| 4,710,911 | 12/1987 | Yamada et al. | 369/100 |
| 4,718,053 | 1/1988 | Sato et al. | 369/100 X |
| 4,841,514 | 6/1989 | Tsuboi et al. | 369/100 |

*Primary Examiner*—Robert L. Richardson
*Attorney, Agent, or Firm*—Wenderoth, Lind & Ponack

[57] ABSTRACT

A method for performing a high quality recording of information signals on an optical disk utilizes reversible structural changes between crystalline and amorphous states of a chalcogenide glass film or the like and two circular or nearly circular laser spots closely arranged along a recording track of optical disk. The preceding spot, which emits a continuous mode or high-frequency mode by far exceeding the recording frequency, operates cancel the past history in the irradiated portion by melting the recording film. The succeeding spot, which is modulated between the power levels for amorphizing and crystallizing according to the recorded information, operates to record new information signals on the track just after erased by the preceding laser spot.

9 Claims, 6 Drawing Sheets

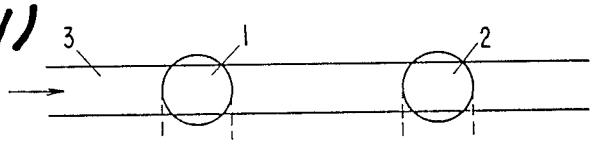
FIG. 1A(1)
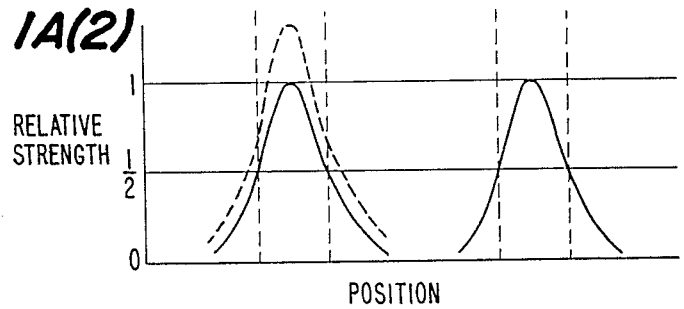
FIG. 1A(2)
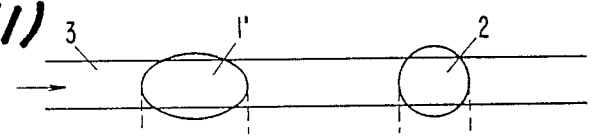
FIG. 1B(1)
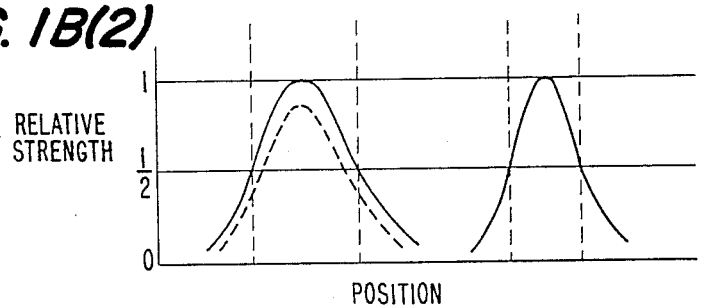
FIG. 1B(2)

ERASING LIGHT WITH NO MODULATION

ERASING LIGHT WITH HIGH FREQ. MODULATION

OPTICAL INFORMATION RECORDING AND ERASING METHOD USING TWO LASER BEAMS ON A PHASE CHANGE OPTICAL RECORDING MEDIUM

BACKGROUND OF THE INVENTION

This invention relates to a method of recording and erasing signals by emitting high density energy flux on a rewritable optical information recording medium, and more particularly to a method of overwriting signals.

Several ideas have been proposed as a method of overwriting an information signal by emitting a laser beam onto a rotating optical information recording medium having a phase change type recording material such as chalcogenide glass film, that is, a method of recording new signals directly over the existing signals while erasing the existing signals. For example, a method of overwriting by using a single laser spot is disclosed in the Japanese Patent Laid-Open No. 56-145530. Furthermore a method of overwriting using two laser spots is unveiled in the Proceedings of SPIE, volume 420, p. 173.

The former method (the method of overwriting using a single laser spot) is generally known as the single laser beam overwrite method, in which the recording medium is irradiated with a laser beam modulated between two levels, a recording level and erasing level. At this time, the portion irradiated with a high laser power is once melted and then cooled to be amorphous, while the portion irradiated with a lower laser power is kept at a temperature exceeding the crystallization temperature for a specified time to be crystallized. When this process is realized, regardless of the state before irradiation with laser beam, that is, whether it is a recording mark part in an amorphous state or an erased part in a crystalline state, it is possible to overwrite using a single laser spot.

The single laser spot overwriting function has various merits, that is, the optical system is simplified, and the access time for rewriting is shortened to half (provided the rotating speed is identical). On the other hand, as a demerit, the erasing ratio is not sufficient (Japanese Journal of Applied Physics, vol. 26, 1987, Suppl. 26-4).

The other method (the method of overwriting using two laser spots) was the first demonstration of the image recording using a phase change type medium. The preceding light spot is elliptical, elongated in the track direction. When this spot passes over the medium the temperature of the medium is raised over the crystallization temperature, and it is kept in that state for a while to be crystallized. As a result, the recording signal recorded in an amorphous state is erased. The succeeding spot is circular. When this spot passes over the medium, the temperature of the medium rises rapidly, instantly exceeding the melting point, and it is quickly cooled the next moment. As a result, a record mark in an amorphous state is formed.

This two-spot method is advantageous in that a high speed overwrite was possible even if a recording material slow in the crystallization speed is used. In this method too, however, the erasing ratio was poor.

A method for improving the erasing ratio has been already disclosed, for example, in the U.S. Pat. No. 4,710,911. This is a method of realizing a melt-anneal process on a medium by disposing two light spots closely on a same track. The part irradiated with the preceding spot is instantly melted and the atomic distribution of the part is randomized to cancel its past history. Thus, a high erasing ratio is established. The succeeding spot irradiates with a moderate power so as not to melt the irradiated part, and crystallizes the portion after the above melting process. This is an operation for writing a new signal in the next step. In this method, however, a third spot is needed for recording a new signal during one pass, and the structure of the optical head has been complicated in order to focus the three spots on the same track at a high precision.

SUMMARY OF THE INVENTION

It is hence a primary object of this invention to present a method of overwriting signals on an optical recording medium while maintaining a high erasing ratio, by successively emitting two closely disposed circular or nearly circular laser spots to the portion to be erased. The preceding spot is emitted on the medium with a high power sufficient to melt the illuminated portion to cancel the past recordings on the medium. The succeeding spot is modulated between the amorphization level and the crystallization level, and a binary value recording is accomplished.

It is a second object of this invention to present an overwriting method having a high precision of disposing the light spots on a track and of their tracking, by shortening the entire length of the spot row by using nearly circular or approximately circular spots.

It is third object of this invention to present an overwriting method having a long service life of laser diodes, especially for the preceding light spot for melting, by shortening the total emission time by modulating the intensity at a frequency higher than the recording frequency.

It is a fourth object of this invention to present a method of overwriting by bringing the two spots closer to each other until they partly overlapped. In this case, the role of the succeeding spot is to control the cooling rate of the portion heated by the preceding spot, so that the same effect as in the primary object may be obtained if driven with a relatively low power.

BRIEF DESCRIPTION OF THE DRAWINGS

FIG. 1A, FIG. 1B are diagrams showing the shape and configuration of laser spots for explaining the optical information recording and erasing method in one of the embodiments of this invention;

DETAILED DESCRIPTION OF THE INVENTION

The following are possible reasons why a sufficiently large erasing ratio is not obtained when overwriting on a rotating optical storage medium using a single laser spot.

One possible reason is that the amorphous state part for forming a record mark and the surrounding crystalline part are mutually different in optical characteristics (optical absorption) and thermal characteristics (thermal conductivity, specific heat). That is, when making a new record directly on a track on which any previous record marks are left over, if the recording part and erasing part are irradiated with a same laser power, a large difference is caused in the heating-cooling process between the two. This fact means that the effect of the previous mark is left over after being overwritten and superposed in a shape of a new record mark, which lowers the erasing ratio.

Another possible reason is that the intensity distribution of a laser spot is a Gaussian distribution. An amorphous mark is formed by rapidly cooling the part melted by laser irradiation. At this time, certain portions crystallized from the molten state are formed in the periphery of the amorphous mark. Such portions are larger in the crystal grain size and aligned in the crystalline orientation as compared with the crystalline state obtained by crystallizing the amorphous mark through a solid process. In other words, when the whole track on which amorphous marks are recorded, is crystallized for erasing through solid process, only the contour shape of the record marks become residual signal as crystals larger in the grain size as compared with the surrounding area, which is a cause of a low erasing ratio.

The second reason above also applies to the insufficiency of the erasing ratio when overwriting using two laser spots.

This invention is intended to establish overwriting with two laser spots while maintaining a high erasing ratio through eliminating the above-discussed causes.

Figure 2A:
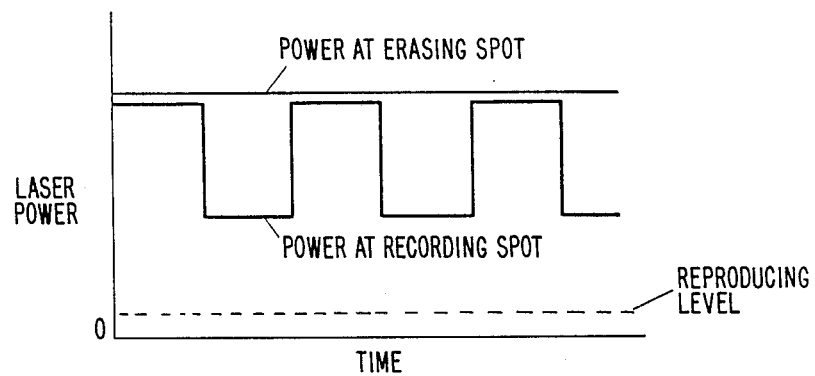
FIG. 2A, FIG. 2B are diagrams to show the irradiation conditions of the above laser spots.
Figure 2B:
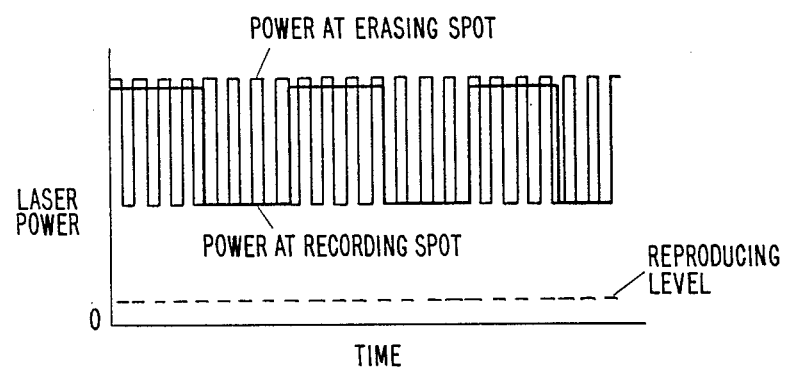

Referring now to FIG. 1 and FIG. 2, the configuration of laser spots and method of irradiation for embodying the optical information recording and erasing method of this invention are described below.

FIG. 1A refers to an embodiment of disposing two circular laser spots on a track 3 of the optical recording medium. When the recording track moves in the direction of the arrow shown in the figure, a certain point on the track will first be irradiated by erasing laser spot 1 and successively irradiated by the recording spot 2. The erasing spot is denoted the "preceding spot" and the recording spot is denoted "succeeding spot". A preceding erasing spot 1 is emitted on the medium with a power equal to the peak power of a recording spot 2 (that is, the power capable of melting the irradiated part) or a slightly higher power. At this time, as shown in FIG. 2, when the erasing spot 1 is emitted as being modulated at a sufficiently higher frequency as compared with recording frequency or without modulation, all the recording film on the track is once melted. As a result, the past history on the track is canceled. Modulation of the laser is effective to extend the life of the laser diode by shortening the emission time.

FIG. 1B relates to an embodiment of using an elliptical light spot somewhat longer in the track direction as erasing spot 1'. Same as in FIG. 1A, the erasing laser spot is not modulated or modulated at a sufficiently higher frequency as compared with the recording frequency, and is emitted prior to the recording laser spot. In the case of a nearly circular erasing laser spot, since the irradiation time becomes longer in proportion to the length, the power density for obtaining the same final temperature may be lowered than in the case of circular erasing spot. However, using too long a spot, the total power becomes larger, resulting in a tendency to thermally damage the recording film. The emission pattern of the presently realized laser diode is an ellipsoidal shape of the ratio of ellipse of about 1:2, when the spot shape is selected approximately in this ellipsoidal form, it is possible to focus efficiently in a simple lens system. That is, a high transmission efficiency and inexpensive optical system can be realized.

The light spot row applied in this invention may be easily realized on the medium surface by synthesizing two laser beams by the optical system. The optical head system disclosed in the aforementioned proceeding of SPIE Vol 420, p. 173 can be applied to this invention. When using a laser diode, it may be easily composed by mounting two laser chips, or using a multi-laser array having two laser emitting parts. The interval of two laser spots may be properly selected. If they are located too far apart from each other, it is difficult to put them into a same lens system, or to arrange them on a same track. Comparing at the position where the intensity of each spot becomes half, it is necessary to keep within about 2 to 100 $\mu$m. A further closer spot configuration is described later (FIG. 4).

Figure 3A:
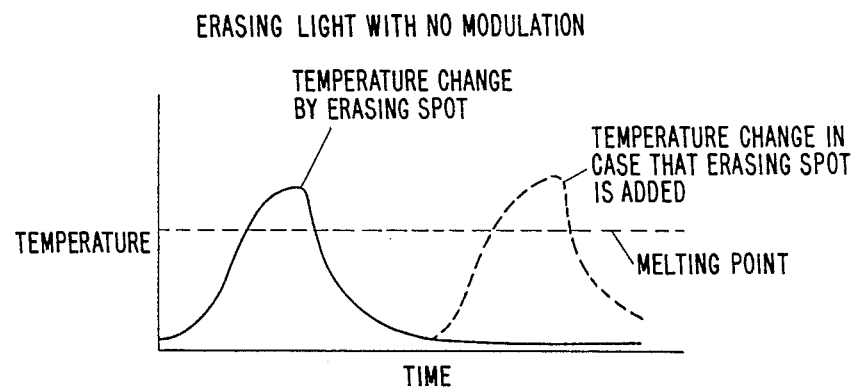
FIG. 3A, FIG. 3B are characteristic diagrams to show the temperature changes of the recording film when irradiated in the above irradiation conditions.
Figure 3B:
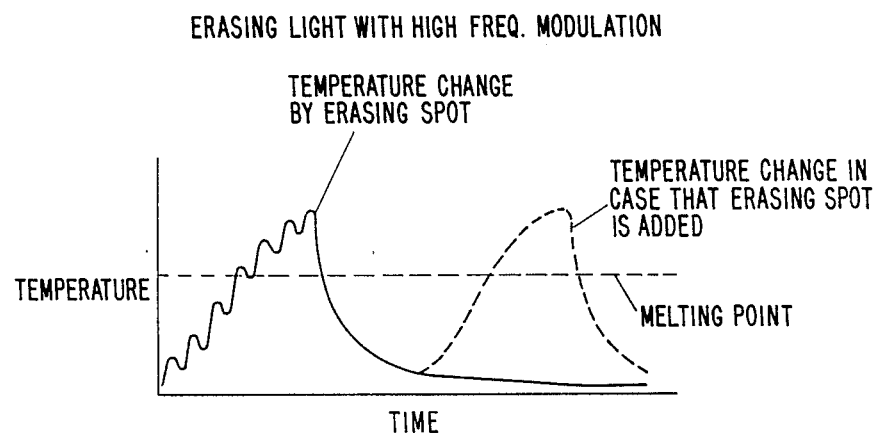

FIG. 3 shows the mode of time-wise temperature changes occurring at one point on the track when overwriting according to the optical information recording and erasing method of this invention. In the diagram, the solid line indicates the temperature changes caused by passing of the erasing spot, and the broken line represents the temperature changes when the recording spot passes in succession. It is known that the irradiated part is once melted whether in erasing-recording or in erasing alone.

Whether the recording mark should be selected at the higher side of the order or at the lower side should be determined by the characteristics of the recording film. When selected at the higher side, the erasing state may be selected at the lower side of the order, and the recording spot may be modulated between the reproducing level and the recording level.

Figure 4A:
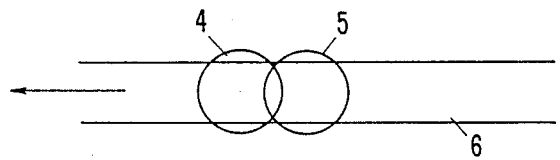
FIG. 4A, FIG. 4B are the shape of the laser spots for explaining another embodiment of the invention, and a drawing to explain their configuration and function.

FIG. 4 shows another spot configuration for embodying the optical information recording and erasing method of this invention. As shown in FIG. 4A, it is characteristic that the two spots are placed every closely to each other. The preceding spot works to once melt the recording film in the irradiated part. In this case it is effective to irradiate continuously with a constant power, but it may be also possible to modulate at a high frequency. When modulating at a high frequency, as compared with the method explained with reference to FIG. 1, it is necessary to raise the frequency further. The succeeding laser spot effects on/off switching corresponding to the recording signal, and the cooling rate from the molten state is controlled.

Figure 4B:
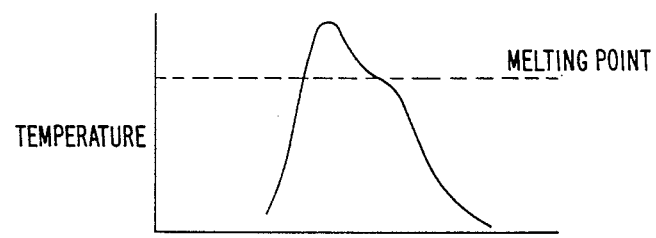
Figure 4C:
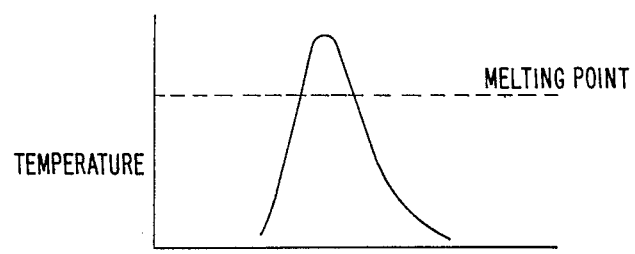

FIG. 4B shows the mode of temperature-dependent change of the recording film in the irradiated part when the second spot is turned on, and FIG. 4C shows the same when it is turned off. It is known from here the recording film is cooled somewhat slowly in an ON state as compared with OFF state When the succeeding spot is turned on, the recording film is cooled slowly from the molten state, and becomes a stable state, for example, a crystalline state. On the other hand, in an OFF state, the recording film is cooled quickly, and a metastable state, such as an amorphous state is formed. In other words, two values may be recorded by modulating the succeeding light spot depending on the signal.

The optical information recording and erasing method of the invention may be applied effectively in all recording media making use of reversible phase changes between an amorphous state and crystal, and between crystals. As the amorphous-crystal phase change material, very high speed crystallizing materials include GeTe, $GeSb_2Te_4$, $Ge_2Sb_2Te_5$, InSe, InSeTlCo and others, and relatively high speed crystallizing materials include GeSnTeAu, GeSbTeSe, TeSnTeO, SeTeSn, GaSeTe, and others. As the crystal-crystal phase change material, InSb, AgZn and others may be used.

This invention is further described below while referring to practical examples.

EMBODIMENT 1

Figure 5:
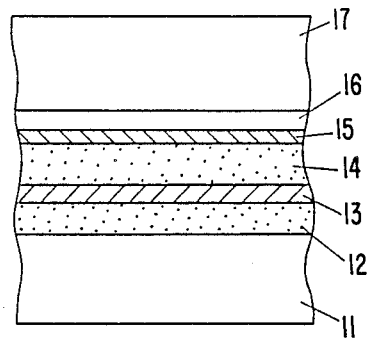
FIG. 5 is a sectional view showing a typical structure of an optical disk for applying the method of this invention.

On a polycarbonate substate of 1.2 mm in thickness and 130 mm in diameter, a ZnS protective layer of 100 nm, $GeSb_2Te_4$ recording layer of 60 nm, ZnS protective layer of 200 nm, and Au reflection layer of 20 nm were sequentially deposited, and an identical polycarbonate substrate was glued thereon by an adhesive, and an optical disk was prepared (FIG. 5). Each layer was formed by evaporating in a vacuum of about $1 \times 10^{-4}$ P. For forming the recording layer, three individually controllable sources and electron guns were used. A substrate may pass sequentially over each source. On the substrate, a track groove of 0.6 $\mu$m in width and 0.07 $\mu$m in depth for optical guide was preliminarily formed.

In the recording and erasing test using a disk, a dynamic tester (deck) having the following laser spots was used. That is, for recording, a laser beam of 780 nm in wavelength was focussed into a circular light spot of half-value width of 0.8 $\mu$m. For erasing, two configurations with a laser beam of 830 nm in wavelength were tested. For one case a laser spot was focussed into a circular spot of half-value width of 0.9 $\mu$m and for the other case it was focussed into an ellipsoidal form of 1:2 elongated longer in the track direction. The interval of the two spots (recording spot and erasing spot) was 5 $\mu$m at the respective half-value points. The disk was rotated at 3600 rpm, and the erasing ratio was measured at two points, that is, the linear speed of 10 m/sec (inner circumference) and 20 m/sec (outer circumference). The measuring procedure is given below.

(a) The track to be measured is initialized (crystallized). As the method of initializing, heating of the disk in an oven and sequential radiation of tracks by laser beam for erasing are known. The latter method was employed here.

(b) At the recording power of 20 mW (20 m/sec), 12 mW (10 m/sec), 5 MHz single frequency mode recording was effected. In both cases, a CNR of about 55 dB was obtained.

(c) The erasing ratio was measured for various power of the erasing spot. The erasing spot was emitted without modulation. The erasing ratio was measured by the difference in the carrier level before and after erasure as measured by a spectrum analyzer.

Figure 6:
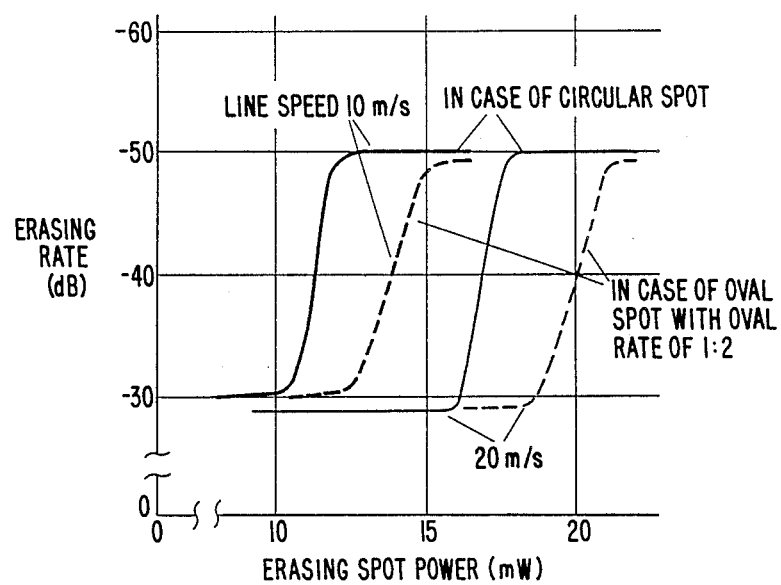
FIG. 6 is a characteristic diagram to show the relation between the erasing power and erasing ratio.

The results of measurement are shown in FIG. 6. It is known from this diagram that each erasing ratio critically increases at certain powers for various conditions of the linear velocity and spot shape. Through transmission electron microscope observation much larger crystal grains were found in the track corresponding to the high erasing ratio as compared with the initialized portion. Particularly, the large crystal grains orthogonal to the track direction in the crystal orientation, which indicated that the recording film on this track was once melted. It is shown that the melting process is very effective to improve the erasing ratio. In this embodiment, a recording film was used which was hard to amorphous using unmodulation irradiation.

EMBODIMENT 2

Of embodiment 1, the circular erasing spot was employed, and the erasing spot and recording spot were disposed on the track so that the interval of half values may be 0 to 100 $\mu$m, and overwriting was effected. The erasing spot was set at a slightly higher powers than the power at which erasing ratio is saturated, that is, 20 mW (20 m/sec) and 14 mW (10 m/sec), and was emitted without modulation, and the recording spot was immediately emitted in succession. The recording spot was modulated between the peak values of 18 to 22 mW (20 m/sec), 12 mW to 16 mW (10 m/sec), and the bias values of 12 mW (20 m/sec), 8 mW (10 m/sec). Recording was effected alternately at the recording frequencies of 5 MHz and 3.5 MHz (20 m/sec), or 2.5 and 3.5 MHz (10 m/sec), and the CNR and erasing ratio of 7 MHz component (20 m/sec) and 3.5 MHz (10 m/sec) were measured. The results corresponding to each power are shown in Table 1.

TABLE 1

| Dependence of Erasing Ratio on Recording Power | | |
|---|---|---|
| Recording power (mW) | CNR (dB) | Erasing Ratio (dB) |
| (a) At linear velocity of 10 m/sec | | |
| 12 | 52 | −44 |
| 13 | 53 | −45 |
| 14 | 54 | −45 |
| 15 | 55 | −41 |
| 16 | 55 | −40 |
| (b) At linear velocity of 20 m/sec | | |
| 18 | 53 | −45 |
| 19 | 54 | −46 |
| 20 | 55 | −46 |
| 21 | 55 | −42 |
| 22 | 56 | −40 |

It is known from this table that the high CNR and high erasing ratio were both realized in overwriting. Similar results were obtained when the erasing spot was nearly circular.

An embodiment of modulating also the erasing light spot is described below.

EMBODIMENT 3

The same system as in embodiments 1, 2 was employed. A recording film was used which was hard to amorphize with unmodulated irradiation. The erasing spot was roughly circular (0.9 × 1.8 $\mu$m), and the erasing spot power was modulated in the condition of a linear velocity of 10 m/sec.

In order to once melt whole of the track, it is necessary to satisfy the relation of $F = > V/L$, supposing the effective radius (half width) of the preceding laser spot in the track direction to be L, the relative speed of the medium and the spot to be V, and the modulation frequency of the erasing spot to be F.

In this embodiment, from the length 1.8 μm of the spot in the track direction and the linear velocity of 10 m/sec, it is calculated that the modulation frequency of over 5 MHz is be necessary in order to melt all positions on the track. At the recording frequency of 2.5 MHz and 3.5 MHz, the CNR and erasing ratio were measured at 3.5 MHz. The recording power was 14 mW and the erasing power was, 15 mW. The results of measurement for various modulation frequencies are shown in Table 2. It is known from this table that the erasing ratio is critically improved when the erasing frequency is over 5 MHz. It was necessary to set the erasing power somewhat higher as compared with the case of irradiation without modulation.

TABLE 2

Relation between Modulation Frequency of Erasing Light and Erasing Ratio

| Modulation frequency of erasing light (MHz) | CNR (dB) | Erasing Ratio (dB) |
|---|---|---|
| 3.5 | 45 | −33 |
| 4 | 48 | −35 |
| 4.5 | 50 | −38 |
| 5 | 52 | −41 |
| 5.5 | 53 | −43 |
| 6 | 54 | −45 |
| 7.5 | 55 | −45 |
| 8 | 55 | −45 |
| 8.5 | 55 | −45 |
| 9 | 55 | −45 |
| 9.5 | 55 | −45 |
| 10 | 55 | −45 |

A next embodiment relates to an example of bringing two spots closer until overlapped.

EMBODIMENT 4

Figure 7A:
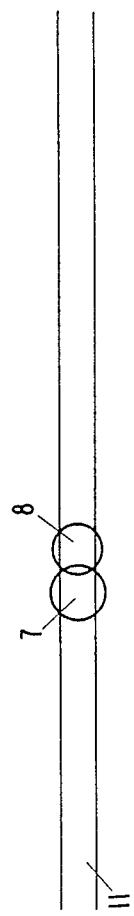
FIG. 7A, FIG. 7B are the diagrams, for further practically showing the structure of the overwriting method of this invention in comparison with the overwriting method using the conventional two-spot configuration.
Figure 7B:
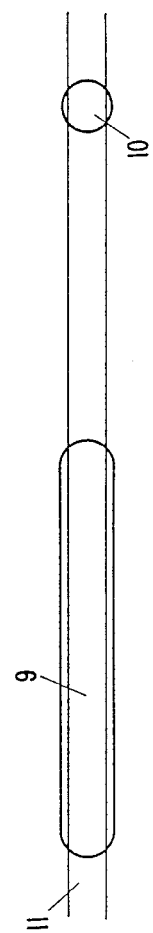

FIG. 7 compares the two-spot configuration of this invention, and the two-spot configuration of the prior art. In the conventional method, the preceding erasing spot was shaped into an oval spot of 1×7 μm (wavelength 830 nm), and the succeeding recording spot was shaped into a circular form of 0.8 μm in diameter (wavelength 780 nm). The interval of the two was 5 μm in half value. In this case, the length from the beginning till the end of the two spots was about 13 μm.

In the composition the two laser spots of this invention, the composition for tester explained in embodiment 1 is used. In this case, the center distance of two circular laser spots was set at 0.7 μm. In this condition, the two spots are partly overlapped, and the length from the beginning till the end of the two spots was about 1.5 μm.

Rotating the disk at 3600 rpm, overwriting was effected at the linear velocity of 15 m/sec points. In other words, a recording of new information signals is tried on a track in which some information signals are previously recorded. The procedure of experiment is shown below.

(a) A signal was recorded on the track at frequency of 5 MHz. At this time, 53 dB of CNR was obtained.

(b) On the above track, a signal of 3 MHz was newly overwritten. At this time, in the method of this invention, 16 mW was continuously emitted as the preceding spot, and the succeeding spot was modulated between 7 mW and the reproducing light level of 1 mW. In the conventional method, the preceding spot was continuously emitted at the power of 20 mW, and the power of the succeeding spot was modulated between 18 mW and the reproducing light level of 1 mW.

(c) The attenuation ratio (erasing ratio) of the 5 MHz signal component and the CNR of 3 MHz signal were measured by spectrum analyzer, and evaluated.

The results of measurement are shown in Table 3.

TABLE 3

|  | Erasing ratio (dB) | CNR (dB) |
|---|---|---|
| Prior art | −37 dB | 54 dB |
| This invention | −43 dB | 53 dB |

It is shown that a high erasing ratio is obtainable by the present recording method in comparison with the conventional method.

Accordingly this invention realizes the following features.

(a) It is possible to overwrite at a high signal quality, that is, without effect of the signal before rewriting when rewriting the information.

(b) The optical system is simple because a nearly circular light spots can be used.

(c) Tracking is easy because the length of spot row is short.

Hence an optical information recording and erasing method having such features is realized.

We claim:

1. An optical information recording method for recording information signals on a rewritable optical information recording medium comprising the steps of;

(a) providing an optical information recording medium which is comprised of at least a substrate and a phase change type recording thin-film formed on said substrate which reversibly changes its ordering of atomic distribution between a relatively more ordered state and a relatively less ordered state according to a condition of a laser irradiation applied thereto, (b) rotating said optical information recording medium and focusing two laser beam spots closely spaced along a same recording track of said optical information recording medium, wherein a preceding one of said two laser beam spots which first irradiates each position of said recording track is circular or nearly circular shaped and a succeeding one of said laser beam spots which irradiates a position of said recording track just irradiated by said preceding laser beam spot is circular shaped, (c) canceling a recording history of said recording track, regardless of a recorded state of said recording track, by irradiation of said preceding laser beam spot having a power level which is sufficiently high to melt said recording thin-film, and, (d) recording binary information signals on said recording track by successive irradiation of said succeeding laser beam spot in a same period of rotation of said optical information recording medium as in step (c), wherein an irradiation power level of said succeeding laser beam spot is modulated between a peak power level sufficient for melting said recording thin-film at an irradiated position and a bias power level insufficient for melting said recording thin-film at an irradiated position.

2. A method according to claim 1, wherein said bias power level is sufficient to recover the ordering of atomic distribution of said recording thin-film when said recording thin-film is in the relatively less ordered state.

3. An optical information recording method for recording information signals on a rewritable optical information recording medium comprising the steps of;
   (a) providing an optical information recording medium which is comprised of at least a substrate and a phase change type recording thin-film formed on said substrate which reversibly changes its ordering of atomic distribution between a relatively more ordered state and a relative less ordered state according to a condition of a laser irradiation applied thereto,
   (b) rotating said optical information recording medium and focusing two laser beam spots closely spaced along a same recording track of said optical information recording medium, wherein a preceding one of said two laser beam spots which first irradiates each position of said recording track is circular or nearly circular shaped and a succeeding one of said two laser beam spots which irradiates a position of said recording track just irradiated by said preceding laser beam spot is circular shaped,
   (c) canceling a recording history of said recording track, regardless of a record state of said recording track, by irradiation of said preceding laser beam spot having a power level which is sufficiently high to melt said recording thin-film, and,
   (d) recording binary information signals on said recording track by successive irradiation of said succeeding laser beam spot in a same period of rotation of said optical information recording medium as in step (c), wherein an irradiation power level of said succeeding laser beam spot is modulated between two power levels, which are each insufficient to melt said recording thin-film, for controlling a cooling rate of a position melted by irradiation of said preceding laser beam spot, a first of said two power levels beings a peak power level for decreasing said cooling rate in order to make said irradiated position a relatively more ordered state, and a second of said two power levels being a bias power level for decreasing said cooling rate in order to make said irradiated position a relatively less ordered state.

4. A method according to claim 1 or 3, wherein said succeeding laser beam spot is in a nearly circular shape which is the same as an emission pattern of a laser diode which is a light source of said preceding laser beam spot and which is elongated in a direction coincident with a direction of said recording track.

5. A method according to claim 4, wherein the emission pattern of the laser diode which is a light source of said preceding laser beam spot has an ellipticity between a ratio of 1 to 1 and a ratio of 2 to 1.

6. A method according to claim 1 or 3, wherein said preceding laser beam spot is modulated between the two power levels at a frequency of $$F => V/L$$

where F is a modulation frequency, V is a relative speed between said optical recording medium and said laser beam spots, and L is an effective radius which is a half width of the power level of said preceding laser beam spot in said track direction.

7. A method according to claim 1 or 3, wherein a power density of said preceding laser beam spot is selected to be at least that of said succeeding laser beam spot so as to make the temperature of an irradiated position of said preceding laser beam spot to be at least that brought of said succeeding laser beam spot.

8. A method according to claim 6, wherein a power density of said preceding laser beam spot is selected to be at least that of said succeeding laser beam spot so as to make the temperature of an irradiated position of said preceding laser beam spot to be at least that brought of said succeeding laser beam spot.

9. A method according to claim 6, further comprising providing said recording thin-film that is composed of a material producing one of a reversible phase change between amorphous and crystalline phases and a reversible phase change between a crystalline phase and another crystalline phase.

* * * * *